(12) United States Patent
Hayashi (10) Patent No.: US 10,795,292 B1
(45) Date of Patent: Oct. 6, 2020

(54) SLIDING MEMBER, FIXING DEVICE, PROCESS CARTRIDGE, AND IMAGE FORMING APPARATUS

(71) Applicant: FUJI XEROX Co., Ltd., Tokyo (JP)

(72) Inventor: Shogo Hayashi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/534,100

(22) Filed: Aug. 7, 2019

(30) Foreign Application Priority Data

Mar. 19, 2019 (JP) .................................. 2019-050904

(51) Int. Cl.
*G03G 15/20* (2006.01)
*B32B 5/12* (2006.01)

(52) U.S. Cl.
CPC ........... *G03G 15/2053* (2013.01); *B32B 5/12* (2013.01); *G03G 15/2017* (2013.01)

(58) Field of Classification Search
CPC ........... G03G 15/2028; G03G 21/1814; G03G 15/2017; G03G 15/2053; G03G 15/2057; B32B 5/12
USPC ..................... 399/322; 428/112, 113, 297.4
See application file for complete search history.

(56) References Cited

U.S. PATENT DOCUMENTS

| 6,263,183 | B1 * | 7/2001 | Schlueter, Jr. ..... | G03G 15/2057 399/307 |
| 6,265,046 | B1 * | 7/2001 | Swift .................... | G03G 15/80 399/37 |
| 10,007,213 | B2 * | 6/2018 | Ikebuchi ............ | G03G 15/2025 |
| 2003/0035913 | A1 * | 2/2003 | Shobert ................ | B29C 70/525 428/36.91 |
| 2005/0147436 | A1 * | 7/2005 | Koyama .............. | G03G 15/206 399/329 |
| 2008/0095557 | A1 * | 4/2008 | Horie .................. | G03G 15/2028 399/329 |
| 2009/0052958 | A1 * | 2/2009 | Okuno ................. | G03G 15/206 399/329 |
| 2014/0241766 | A1 * | 8/2014 | Ishii ................... | G03G 15/2025 399/329 |
| 2014/0376954 | A1 * | 12/2014 | Uno .................... | G03G 15/0898 399/103 |
| 2016/0274515 | A1 * | 9/2016 | Imada ................. | G03G 15/2053 |
| 2016/0320732 | A1 * | 11/2016 | Tonomori ............ | F16C 33/201 |
| 2018/0328535 | A1 * | 11/2018 | Azuma ................. | F16N 15/00 |

FOREIGN PATENT DOCUMENTS

| JP | 05297748 A | * | 11/1993 |
| JP | 2005-084160 A | | 3/2005 |
| JP | 2014145840 A | * | 8/2014 |
| JP | 2016110020 A | * | 6/2016 |

* cited by examiner

*Primary Examiner* — Robert B Beatty
(74) *Attorney, Agent, or Firm* — Sughrue Mion, PLLC (57) ABSTRACT

A sliding member contains a resin and a fibrous filler. The dynamic friction coefficient of a surface of the sliding member in an in-plane direction A of the surface is 0.08 or more lower than the dynamic friction coefficient of the surface in an in-plane direction B angled at 90 degrees with respect to the in-plane direction A.

17 Claims, 4 Drawing Sheets

μA is 0.08 or more lower than μB

FIG. 1

μA is 0.08 or more lower than μB

SLIDING MEMBER, FIXING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2019-050904 filed Mar. 19, 2019.

BACKGROUND

(i) Technical Field

The present disclosure relates to a sliding member, a fixing device, a process cartridge, and an image forming apparatus.

(ii) Related Art

In an electrophotographic image forming apparatus, unfixed toner images on a recording medium are fixed by a fixing device to form an image.

Belt nip-type fixing devices are known as the fixing device. Such a belt nip-type fixing device has a structure including a heating roller and a pressure belt in contact with the heating roller or a structure including a heating belt and a pressure roller in contact with the heating belt.

In a belt nip-type fixing device, a pressing member presses a belt against a roller from the inner surface side of the belt, and a sliding member may be disposed between the belt and the pressing member in order to reduce the sliding resistance caused by the rotation of the belt. If no sliding member is disposed, the press surface of the pressing member serves as a sliding surface against the belt.

For example, Japanese Unexamined Patent Application Publication No. 2005-084160 discloses that, in a sliding member in contact with and slidable along the inner surface of a belt-like rotary member that is driven to rotate by a driving member, at least a portion of the sliding surface of the sliding member in contact with the inner surface of the belt-like rotary member is made of a heat resistant resin containing a carbon nanotube.

SUMMARY

Aspects of non-limiting embodiments of the present disclosure relate to a sliding member having lower dynamic friction coefficient and higher wear resistance than a sliding member in which a difference between the dynamic friction coefficient of a surface of the sliding member in an in-plane direction A of the surface and the dynamic friction coefficient of the surface in an in-plane direction B angled at 90 degrees with respect to the in-plane direction A is less than 0.08, or the filler orientation ratio A of a fibrous filler in the sliding member is 60% or less, the filler orientation ratio A being represented by A=(N'/N)×100, where N is the total number of filler molecules, and N' is the number of filler molecules whose angle θ with respect to an in-plane direction A of a surface of the sliding member satisfies −30°≤θ≤30°.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sliding member including a resin and a fibrous filler, wherein a dynamic friction coefficient of a surface of the sliding member in an in-plane direction A of the surface is 0.08 or more lower than a dynamic friction coefficient of the surface in an in-plane direction B angled at 90 degrees with respect to the in-plane direction A.

BRIEF DESCRIPTION OF THE DRAWINGS

Exemplary embodiments of the present disclosure will be described in detail based on the following figures, wherein.

DETAILED DESCRIPTION

Exemplary embodiments will be described below. The following description and Examples are provided to illustrate exemplary embodiments of the present disclosure and are not construed as limiting the scope of the exemplary embodiments.

The upper limit or the lower limit of one numerical range in stepwise numerical ranges in exemplary embodiments may be replaced by the upper limit or the lower limit of another stepwise numerical range. The upper limit or the lower limit of any numerical range described in exemplary embodiments may be replaced by the values described in Examples.

In exemplary embodiments, the term "step" not only includes an independent step but also includes a step that cannot be clearly distinguished from other steps but may accomplish an intended purpose.

In the description of exemplary embodiments with reference to the drawings in the exemplary embodiments, the structures of the exemplary embodiments are not limited to the structures illustrated in the drawings. Moreover, the sizes of the members in each of the drawings are conceptual sizes, and the relative relationship between the sizes of the members is not limited to that illustrated in the drawings.

In exemplary embodiments, each component may contain a plurality of substances corresponding to the component. In the exemplary embodiments, the amount of each component in a composition refers to, when there are several substances corresponding to the component in the composition, the total amount of the substances present in the composition, unless otherwise specified.

Sliding Member

In a first aspect of a sliding member according to an exemplary embodiment, the sliding member contains a resin and a fibrous filler, wherein the dynamic friction coefficient of a surface of the sliding member in an in-plane direction A of the surface is 0.08 or more lower than the dynamic friction coefficient of the surface in an in-plane direction B angled at 90 degrees with respect to the in-plane direction A.

In a second aspect of the sliding member according to the exemplary embodiment, the sliding member contains a resin and a fibrous filler, wherein the filler orientation ratio A of the fibrous filler represented by A=(N'/N)×100 is more than 60%, where N is the total number of filler molecules, and N' is the number of filler molecules whose angle θ with respect to an in-plane direction A of a surface of the sliding member satisfies −30°≤θ≤30°.

In this specification, the term "sliding member according to the exemplary embodiment" includes the sliding members in both the first aspect and the second aspect, unless otherwise specified.

The sliding member according to the exemplary embodiment may be used as a sliding member for a fixing device.

Many sliding members including a fluorocarbon resin surface layer to reduce friction coefficient have been known. However, such a sliding member is worn by a member to be slid because fluorocarbon resin has low wear resistance and low durability. There is thus proposed a method for improving the wear resistance of a fluorocarbon resin layer by introducing a fibrous filler to the fluorocarbon resin layer (see e.g., Japanese Unexamined Patent Application Publication No. 2005-084160).

However, the presence of the fibrous filler increases dynamic friction coefficient and degrades low sliding properties.

The sliding member according to the exemplary embodiment having the foregoing features has low dynamic friction coefficient and high wear resistance. The reason for this is not clear but assumed as described below.

The sliding member contains a resin and a fibrous filler. The dynamic friction coefficient of the surface of the sliding member in an in-plane direction A of the surface is 0.03 or more lower than the dynamic friction coefficient of the surface in an in-plane direction B angled at 90 degrees with respect to the in-plane direction A, or the filler orientation ratio A of the fibrous filler represented by A=(N'/N)×100 is more than 60%, where N is the total number of filler molecules, and N' is the number of filler molecules whose angle θ with respect to an in-plane direction A of a surface of the sliding member satisfies −30°≤θ≤30°. Accordingly, the filler may be controlled to be oriented in one direction of the sliding member, and the direction of long axis orientation of the filler may correspond to the sliding direction during the use of the sliding member. This may suppress increases in dynamic friction coefficient and improve wear resistance.

The sliding member according to the exemplary embodiment will be described below in detail with reference to the drawings.

The shape of the sliding member according to the exemplary embodiment is not limited and appropriately selected according to the intended purpose. The sliding member according to the exemplary embodiment may have a sheet shape, that is, may be a sliding sheet.

The sliding member according to the exemplary embodiment may be a monolayer sliding member or may be a multilayer sliding member. The sliding member according to the exemplary embodiment may have, on at least one surface, a layer containing a resin and a fibrous filler, and the surface may satisfy the foregoing dynamic friction coefficient or the foregoing orientation ratio A.

In the case of the sliding sheet, the sliding sheet may have the layer containing a resin and a fibrous filler on one surface or both surfaces or may be a monolayer sheet containing a resin and a fibrous filler.

The thickness of the layer containing a resin and a fibrous filler is preferably, but not necessarily, 1 μm or more and 500 μm or less, more preferably 5 μm or more and 200 μm or less, and still more preferably 10 μm or more and 100 μm or less.

Figure 1:
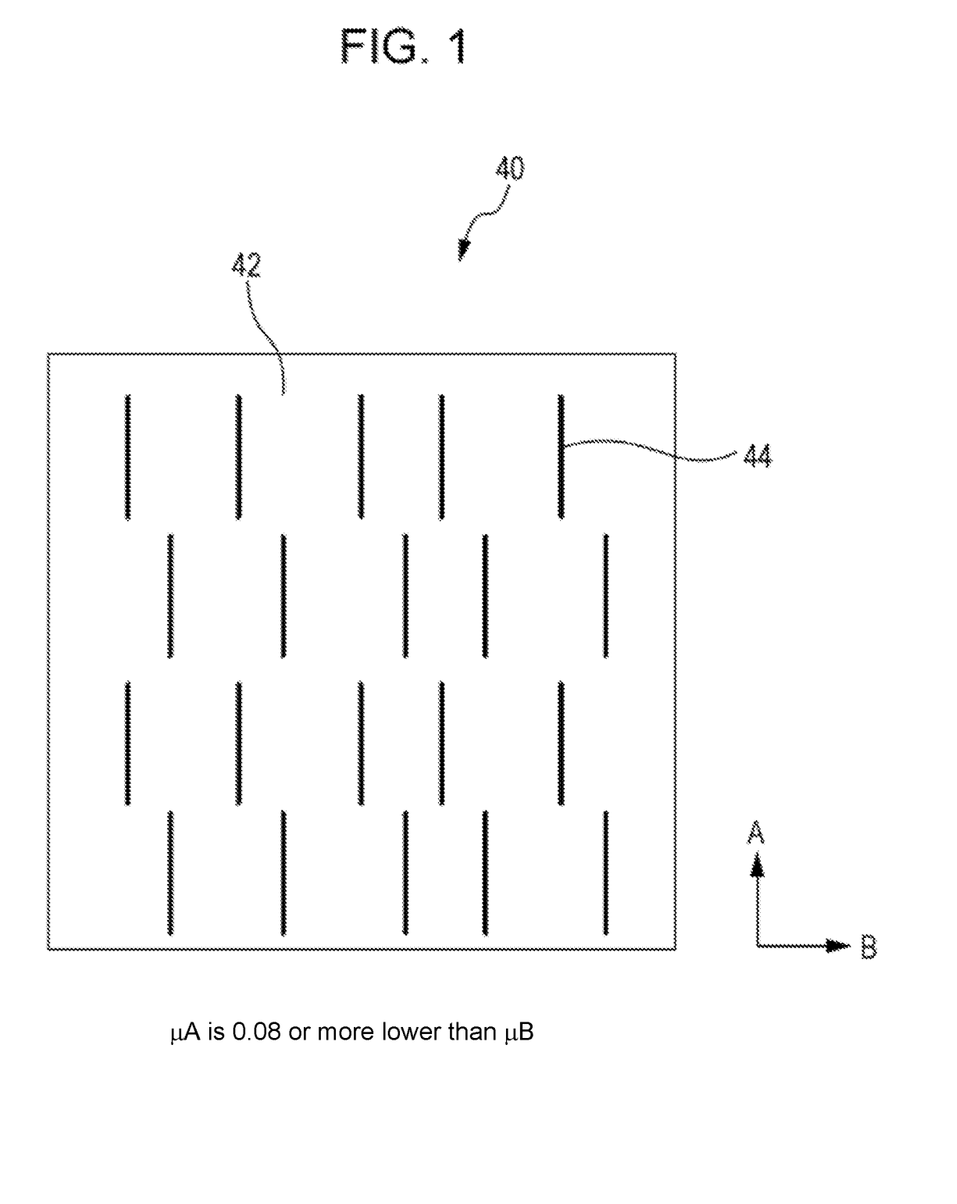
FIG. 1 is a schematic view of an example sliding member according to an exemplary embodiment.

FIG. 1 is a schematic view of an example sliding member according to the exemplary embodiment.

A sliding member 40 illustrated in FIG. 1 includes, on one surface, a layer containing a resin 42 and a fibrous filler 44. The fibrous filler 44 is oriented in such a manner that the long axis direction corresponds to the in-plane direction A.

The in-plane direction B in FIG. 1 is the in-plane direction angled at 90 degrees with respect to the in-plane direction A.

Moreover, FIG. 1 is a schematic view of the sliding member 40 having an orientation ratio A of 100%.

Dynamic Friction Coefficient in In-Plane Direction A and Dynamic Friction Coefficient in In-Plane Direction B In the first aspect of the sliding member according to the exemplary embodiment, the dynamic friction coefficient of the surface of the sliding member in the in-plane direction A is 0.08 or more lower than the dynamic friction coefficient of the surface in the in-plane direction B angled at 90 degrees with respect to the in-plane direction A.

In the first aspect of the sliding member according to the exemplary embodiment, a difference (μB−μA) between the dynamic friction coefficient μA in the in-plane direction A and the dynamic friction coefficient μB in the in-plane direction B is preferably 0.10 or more, and more preferably 0.12 or more and 0.40 or less, in view of wear resistance.

In the second aspect of the sliding member according to the exemplary embodiment, a difference (μB−μA) between the dynamic friction coefficient μA in the in-plane direction A and the dynamic friction coefficient μB in the in-plane direction B is preferably 0.08 or more, more preferably 0.10 or more, and still more preferably 0.12 or more and 0.40 or less, in view of wear resistance.

The dynamic friction coefficient μA in the in-plane direction A in the sliding member according to the exemplary embodiment is preferably 0.4 or less, more preferably 0.3 or less, still more preferably 0.28 or less, and yet still more preferably 0.23 or less, in view of low dynamic friction coefficient and wear resistance. The dynamic friction coefficient μA in the in-plane direction A is preferably as low as possible in view of low dynamic friction coefficient and wear resistance, and the lower limit of the dynamic friction coefficient μA is preferably 0.05 or more.

The dynamic friction coefficient μB in the in-plane direction B in the sliding member according to the exemplary embodiment is preferably 0.2 or more and 0.6 or less, more preferably 0.3 or more and 0.5 or less, and still more preferably 0.30 or less and 0.45 or less, in view of low dynamic friction coefficient and wear resistance.

In the sliding member according to the exemplary embodiment, the ratio (μA/μB) of the dynamic friction coefficient μA in the in-plane direction A to the dynamic friction coefficient μB in the in-plane direction B angled at 90 degrees with respect to the in-plane direction A is preferably 0 or more and 0.95 or less, more preferably 0 or more and 0.9 or less, still more preferably 0.05 or more and 0.75 or less, and yet still more preferably 0.1 or more and 0.7 or less, in view of low dynamic friction coefficient and wear resistance.

The dynamic friction coefficient in the sliding member according to the exemplary embodiment is determined by the following method.

A polyimide sheet is placed on a stage heated to 170° C. in a friction and wear tester (FPR-2100 available from RHESCA Co., Ltd.), and a sliding member is placed in contact with a pin. The dynamic friction coefficient in rotation sliding at 100 mm/s and a radius of 40 mm is measured.

Orientation Ratio A

In the second aspect of the sliding member according to the exemplary embodiment, the filler orientation ratio A of the fibrous filler represented by A=(N'/N)×100 is more than 60%, where N is the total number of filler molecules, and N' is the number of filler molecules whose angle θ with respect to the in-plane direction A of the surface of the sliding member satisfies −30°≤θ≤30°. The filler orientation ratio A is preferably 65% or more, more preferably 70% or more, and still more preferably 72% or more and 100% or less, in view of low dynamic friction coefficient and wear resistance.

In the first aspect of the sliding member according to the exemplary embodiment, the filler orientation ratio A of the fibrous filler is preferably more than 60%, more preferably 65% or more, still more preferably 70% or more, and yet still more preferably 72% or more and 100% or less, in view of low dynamic friction coefficient and wear resistance. The filler orientation ratio A is represented by A=(N'/N)×100, where N is the total number of filler molecules, and N' is the number of filler molecules whose angle θ with respect to the in-plane direction A of the surface of the sliding member satisfies −30°≤θ≤30°.

The orientation ratio A in the sliding member according to the exemplary embodiment is determined by the following method.

Under an optical microscope, 50 or more fibrous filler molecules in the surface of the sliding member are observed, and the number N' of filler molecules whose angle θ satisfies −30°≤θ≤30° with respect to the number N of observed filler molecules is calculated to obtain the orientation ratio A.

Fibrous Filler

The sliding member according to the exemplary embodiment contains a fibrous filler.

In the case where the sliding member according to the exemplary embodiment has a layered structure, the sliding member may contain a fibrous filler in at least one surface layer.

Examples of the fibrous filler include carbon nanotubes, carbon fibers, and glass fibers. The fibrous filler may be a carbon nanotube in view of low dynamic friction coefficient and wear resistance.

Carbon nanotubes (CNTs) are formed of a graphene (six-membered ring network) sheet rolled up into a hollow cylindrical shape and have a diameter of several nanometers to 100 nm and a length of several nanometers to several micrometers. Carbon nanotubes include single-wall carbon nanotubes (MWCNTs) formed of one graphene sheet in a hollow cylindrical shape; and multi-wall carbon nanotubes (MWCNTs) having a multilayer structure.

In the exemplary embodiment, either single-wall carbon nanotubes or multi-wall carbon nanotubes may be used.

Carbon nanotubes have high electrical conductivity, large surface area (1,000 m²/g in closed state, 2,000 m²/g in open state), and high strength (20 times stronger than steel, especially stronger than diamond in terms of tensile strength in fiber direction). Main characteristics of carbon nanotubes include lightness in weight, which is half the weight of aluminum; flexibility and high Young's modulus; high current density resistance, which is higher than that of copper by a factor of 1,000 or more; high thermal conductivity, which is 10 times higher than that of copper; and long and narrow shape.

Moreover, the hexagons of graphene in carbon nanotubes may be oriented in various directions with respect to the axis of the tubes. The helical structure thus formed is called a chiral structure, and the two-dimensional lattice vector from a reference point of a 6-membered ring on graphene is called a chiral vector ($C_h$). The chiral vector is represented by the following formula using the two basis translation vectors $a^1$ and $a^2$ of a two-dimensional hexagonal lattice.

$$C_h = na^1 + ma^2$$

A pair (n, m) of these two integers is called a chiral index and used to express the structure of nanotubes. The tube diameter and the helix angle in carbon nanotubes are determined by the chiral index.

The conformation of carbon nanotubes depends on the chiral index. If n=m, carbon nanotubes have tubular arrays of carbon atoms called an armchair structure and exhibit metallic behavior. If m=0, carbon nanotubes have tubular arrays of carbon atoms called a zigzag structure. Otherwise, carbon nanotubes have a normal tubular helical structure called a chiral structure. For a carbon nanotube, if the value of (n−m) is a multiple of 3, the carbon nanotube exhibits metallic behavior (metallic carbon nanotube); if the value of (n−m) is not a multiple of 3, the carbon nanotube exhibits semiconducting behavior (semiconducting carbon nanotube).

In the exemplary embodiment, various carbon nanotubes may be used depending on the intended purpose.

The aspect ratio (fiber length/fiber diameter) of the fibrous filler is preferably 5 or more, more preferably 10 or more and 200 or less, still more preferably 15 or more and 100 or less, and yet still more preferably 20 or more and 60 or less, in view of low dynamic friction coefficient and wear resistance.

The fiber diameter of the fibrous filler is preferably 0.005 μm or more and 2 μm or less, more preferably 0.01 μm or more and 1.5 μm or less, and still more preferably 0.02 μm or more and 1.0 μm or less, and yet still more preferably 0.05 μm or more and 0.5 μm or less, in view of low dynamic friction coefficient and wear resistance.

The fiber length of the fibrous filler is preferably 0.5 μm or more and 100 μm or less, more preferably 1 μm or more and 60 μm or less, and still more preferably 2 μm or more and 20 μm or less, and yet still more preferably 3 μm or more and 10 μm or less, in view of low dynamic friction coefficient and wear resistance.

The fiber diameter and the fiber length of the fibrous filler in the exemplary embodiment are obtained as follows: dissolving the sliding member in a solvent to extract the fibrous filler; and determining the fiber diameter or the fiber length of 100 or more fibrous filler molecules by magnification with an optical microscope or a scanning electron microscope to obtain the arithmetic mean.

The amount of the fibrous filler in the sliding member according to the exemplary embodiment is preferably, but not necessarily, 2 vol % or more and 40 vol % or less, more preferably 3 vol % or more and 30 vol % or less, still more preferably 5 vol % or more and 25 vol % or less, and 8 vol % or more and 20 vol % or less with respect to the total volume of the resin, in view of low dynamic friction coefficient and wear resistance.

In the case where the sliding member according to the exemplary embodiment has a layer containing a resin and a fibrous filler, the amount of the fibrous filler in the layer may be the same as the foregoing amount.

Resin

The sliding member according to the exemplary embodiment contains a resin.

In the case where the sliding member according to the exemplary embodiment has a layered structure, the sliding member may contain a resin in at least one surface layer.

Examples of the resin include fluorocarbon resin, polyimide resin, polyamide resin, polyamide imide resin, polyether ester resin, polyarylate resin, and polyester resin. The sliding member preferably contains a fluorocarbon resin or a polyimide resin and more preferably contains a fluorocarbon resin among these resins in view of low dynamic friction coefficient and wear resistance.

In the sliding member according to the exemplary embodiment, the amount of the fluorocarbon resin with respect to the total mass of the resin is preferably 50 mass % or more, more preferably 80 mass % or more and 100 mass % or less, still more preferably 90 mass % or more and 100 mass % or less, and yet still more preferably 95 mass % or more and 100 mass % or less in view of low dynamic friction coefficient and wear resistance.

The resin may be used alone or in combination of two or more.

Examples of the fluorocarbon resin include polytetrafluoroethylene (PTFE), a tetrafluoroethylene-perfluoroalkyl vinyl ether copolymer (perfluoroalkoxy alkane, PFA), a tetrafluoroethylene-hexafluoropropylene copolymer (FEP), an ethylene-tetrafluoroethylene copolymer (ETFE), and modified products thereof.

Among these, the fluorocarbon resin is preferably at least one resin selected from the group consisting of polytetrafluoroethylene (PTFE), a tetrafluoroethylene-perfluoroalkyl vinyl ether copolymer (PFA), and a tetrafluoroethylene-hexafluoropropylene copolymer (FEP), more preferably PTFE or PFA, and still more preferably PTFE in view of low dynamic friction coefficient and wear resistance.

The fluorocarbon resin may be a crosslinked polytetrafluoroethylene (crosslinked PTFE).

Examples of the crosslinked PTFE include a PTFE crosslinked by exposing a non-crosslinked PTFE to ionizing radiation. Specifically, the crosslinked PTFE is, for example, a PTFE crosslinked by exposure of a non-crosslinked PTFE heated at a temperature higher than the crystalline melting point to ionizing radiation (e.g., a γ-ray, an electron beam, an X-ray, a neutron beam, or a high energy ion) at a radiation dose of 1 KGy or more and 10 MGy or less in the absence of oxygen.

The crosslinked PTFE may contain a copolymer component other than tetrafluoroethylene, such as perfluoro(alkyl vinyl ether), hexafluoropropylene, (perfluoroalkyl)ethylene, and chlorotrifluoroethylene.

Recess

The sliding member according to the exemplary embodiment may have recesses distributed over the sliding surface (the surface of a portion containing a resin and a fibrous filler). The recesses are provided for the purpose of holding a lubricant (oil) and supplying the lubricant (oil) to a region in contact with the member to be slid and for the purpose of reducing the area of the contact region to lower friction coefficient.

A periodic arrangement of recesses may be distributed over the sliding surface.

Examples of the periodic arrangement include, but are not limited to, an arrangement pattern having a lattice or a face-centered lattice as a unit. The lattice may be any of square lattice, rectangular lattice, rhombic lattice, and other parallelogram lattice. The face-centered lattice means a structure having total five lattice points of the unit cell, specifically, the vertices of a parallelogram and the point of intersection of the diagonals.

The periodic arrangement may be interrupted or displaced, but preferably continuously repeated without any interruption in every direction.

The recesses have any shape as long as the recesses may have a function of holding and supplying a lubricant (oil).

Examples of the shape of the recesses in the planar direction include circular shape, elliptical shape, triangular shape, quadrilateral shape, other polygonal shapes, and irregular shapes. The recesses preferably have a circular shape in order to facilitate the process of forming recesses on the sliding surface.

Examples of the shape of the recesses in the depth direction include columnar shape, cone shape, tapered shape, and inverse tapered shape.

Substrate

The sliding member according to the exemplary embodiment may have a substrate.

In the case where the sliding member according to the exemplary embodiment has a substrate, the sliding member may have, on at least part of the surface of the substrate, a layer containing a resin and a fibrous filler.

The substrate may have any desired shape and preferably have a sheet shape.

The substrate may be made of any known material.

Examples of the substrate include a resin substrate, a woven fabric, and a non-woven fabric.

Examples of the resin include polyimide resin, polyamide resin, polyamide imide resin, polyether ester resin, polyarylate resin, and polyester resin.

Examples of fibers used for a woven fabric and a non-woven fabric include synthetic resin fibers, natural fibers, and glass fibers. Among these, a glass cloth is preferably used.

In the case where the substrate has a sheet shape, the thickness of the substrate is preferably, but not necessarily, 5 μm or more and 500 μm or less, more preferably 8 μm or more and 300 μm or less, still more preferably 10 μm or more and 200 μm or less, and yet still more preferably 13 μm or more and 100 μm or less.

Adhesive Layer

The sliding member according to the exemplary embodiment may have an adhesive layer.

In the case where the sliding member has a structure in which layers are stacked in the thickness direction, an adhesive layer for bonding one layer to another layer may be present between the layers.

The adhesive layer may be formed of a known adhesive, such as a heat-resistant silicone resin or an epoxy-based resin, may be fused by using a fluorocarbon resin dispersion, or may be formed by using an adhesive sheet.

The adhesive sheet may be an adhesive sheet that may cause thermal fusion upon application of heat above the melting point to form a bond between the stacked layers. In particular, the adhesive sheet is preferably a fluorocarbon-based adhesive sheet. Specific examples include trade name Silkybond (available from Junkosha Inc.).

The adhesive sheet may have any thickness and may have a thickness of 10 μm or more and 30 μm or less.

Method for Manufacturing Sliding Member

A method for manufacturing a sliding member according to an exemplary embodiment is any manufacturing method in which a fibrous filler is oriented so as to satisfy the foregoing relationship of the dynamic friction coefficient or the foregoing orientation ratio A. Examples of the method include an extrusion method and a coating method under application of shear stress.

Examples of the extrusion method include a method for producing a sliding member including an oriented fibrous filler by melt-kneading a fibrous filler and a resin and then extruding the melt-kneaded product through an extruder.

Examples of the coating method under application of shear stress include a method for producing a sliding member including an oriented fibrous filler by preparing a coating liquid containing a fibrous filler, a resin, and a solvent, applying the coating liquid onto the substrate through blade coating under application of shear stress, and drying the coating liquid. The layer containing a resin and a fibrous filler may be peeled off from the substrate as necessary to produce a sheet containing the resin and the fibrous filler. The distance between the substrate and the blade in the blade coating is appropriately set according to the intensity of shear stress to be applied, the intended film thickness, and the solids content of the liquid. The distance is preferably 10 µm or more and 200 µm or less, and more preferably 20 µm or more and 150 µm or less.

Fixing Device

A fixing device according to an exemplary embodiment includes a first rotary member; a second rotary member disposed in contact with the outer surface of the first rotary member; a pressing member that is disposed inside the second rotary member and presses the second rotary member from the inner surface of the second rotary member against the first rotary member; and a sliding member interposed between the inner surface of the second rotary member and the pressing member. The sliding member is the sliding member according to the present disclosure.

The fixing device according to the exemplary embodiment may further include a heat source that heats at least one of the first rotary member and the second rotary member.

The surface roughness Ra of the inner surface of a heating belt or a pressure belt, which is an example of the second rotary member, is preferably 0.1 µm or more and 2.0 µm or less, and more preferably 0.3 µm or more and 1.5 µm or less. With the surface roughness Ra in the foregoing range, the sliding resistance between the sliding member and the heating belt or the pressure belt, which is an example of the second rotary member, may be low. Moreover, it may be easy to hold a lubricant (oil) between the sliding member and the heating belt or the pressure belt when the lubricant (oil) is present therebetween. This may improve the wear resistance of the sliding member.

The surface roughness Ra is determined by using a surface roughness measuring instrument SURFCOM 1400A (available from Tokyo Seimitsu Co., Ltd.) in accordance with JIS B0601-1994 under the measuring conditions of an evaluation length Ln of 4 mm, a sampling length L of 0.8 mm, and a cutoff value of 0.8 mm.

The fixing device according to the exemplary embodiment may have various structures, and two exemplary embodiments will be specifically described below.

In a first exemplary embodiment, a fixing device including a heating roller having a heat source and a pressure belt pressed by a pressing pad will be described.

In a second exemplary embodiment, a fixing device including a pressure roller and a heating belt having a heat source and pressed by a pressing pad will be described.

The sliding member according to the exemplary embodiment is used as a sheet-shaped sliding member in these fixing devices.

First Exemplary Embodiment of Fixing Device

Figure 2:
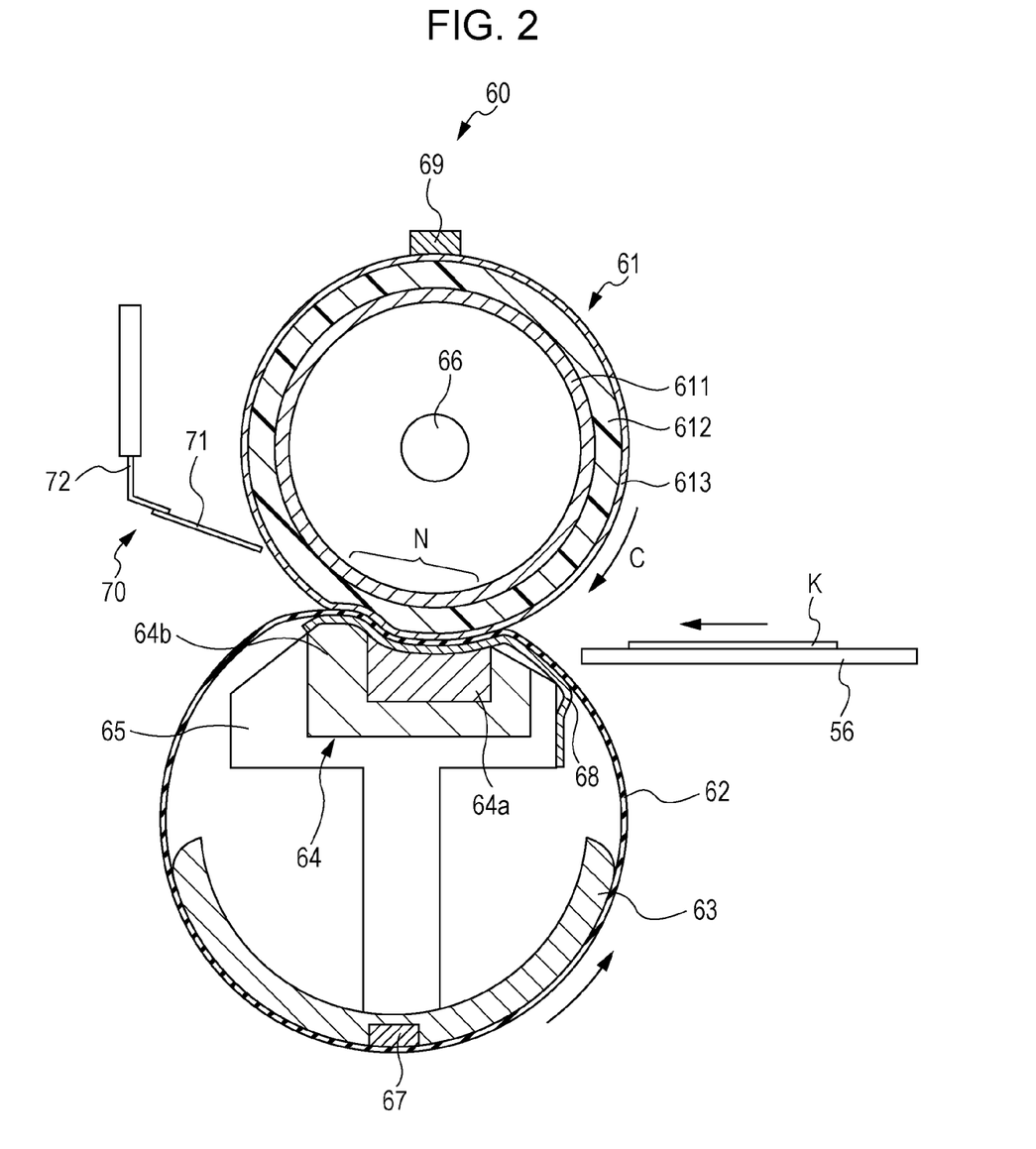
FIG. 2 is a schematic view of one example structure of a fixing device according to an exemplary embodiment.

Referring to FIG. 2, a fixing device 60 according to a first exemplary embodiment will be described.

FIG. 2 is a schematic view of the structure of the fixing device 60 according to the first exemplary embodiment.

The fixing device 60 includes a heating roller 61 (an example of the first rotary member), a pressure belt 62 (an example of the second rotary member), a pressing pad 64 (an example of the pressing member), a sliding member 68 (an example of the sliding member according to the exemplary embodiment), and a halogen lamp 66 (an example of the heat source).

The outer surface of the heating roller 61 is in press contact with the outer surface of the pressure belt 62. The pressure belt 62 may press the heating roller 61, or the heating roller 61 may press the pressure belt 62. A nip region N (nip part) is formed in a region where the heating roller 61 is in contact with the pressure belt 62.

The heating roller 61 includes the halogen lamp 66 (an example of the heat source) inside. The heat source is not limited to a halogen lamp and may be other heating member that generates heat.

A thermosensor 69 is disposed in contact with the outer surface of the heating roller 61. On the basis of the temperature detected by the thermosensor 69, lighting of the halogen lamp 66 is controlled to maintain the surface temperature of the heating roller 61 at a preset temperature (e.g., 150° C.)

The heating roller 61 is formed by, for example, stacking a heat-resistant elastic layer 612 and a release layer 613 in this order around a metal core (cylindrical core metal) 611.

The pressure belt 62 is disposed in contact with the outer surface of the heating roller 61.

The pressure belt 62 is rotatably supported by the pressing pad 64 and a belt travel guide 63, which are disposed inside the pressure belt 62.

The pressing pad 64 is disposed inside the pressure belt 62, and the pressing pad 64 and the heating roller 61 press each other with the pressure belt 62 interposed therebetween.

The pressing pad 64 includes a front nipping member 64a on the entrance side of the nip region N and a peeling nipping member 64b on the exit side of the nip region N.

The front nipping member 64a has a recess shape in conformance with the outer shape of the heating roller 61 and ensures the length (the distance in the sliding direction) of the nip region N.

The peeling nipping member 64b is shaped so as to protrude toward the outer surface of the heating roller 61 and causes local distortion of the heating roller 61 in an exit region of the nip region N, which makes it easy to peel the recording medium from the heating roller 61 after fixation.

The sliding member 68 has a sheet shape and is disposed between the pressure belt 62 and the pressing pad 64 in such a manner that the sliding surface (recess-distributed surface) of the sliding member 68 is in contact with the inner surface of the pressure belt 62.

The sliding member 68 is involved in the holding and supply of a lubricant (oil) present between the sliding surface of the sliding member 68 and the inner surface of the pressure belt 62. The sliding member 68 has high wear resistance and contributes to the life extension of the fixing device 60.

The sliding member 68 is disposed so as to cover the front nipping member 64a and the peeling nipping member 64b in order to reduce the sliding resistance between the inner surface of the pressure belt 62 and the pressing pad 64.

A holding member 65 holds the pressing pad 64 and the sliding member 68. The holding member 65 is made of, for example, metal.

The belt travel guide 63 is attached to the holding member 65. The pressure belt 62 rotates along the belt travel guide 63.

The belt travel guide 63 may be provided with a lubricant supplying device 67, which is a device that supplies a lubricant (oil) to the inner surface of the pressure belt 62.

A peeling member 70 is provided downstream of the nip region N. The peeling member 70 helps to peel a recording medium. The peeling member 70 includes a peeling claw 71 and a holding member 72 holding the peeling claw 71. The peeling claw 71 is disposed adjacent to the heating roller 61 in such a manner that the peeling claw 71 is oriented in the direction (counter direction) opposite to the rotation direction of the heating roller 61.

The heating roller 61 is rotated in the direction of an arrow C by a drive motor (not shown). The pressure belt 62 is driven to rotate in the direction opposite to the rotation direction of the heating roller 61 as the heating roller 61 rotates.

A sheet of paper K (recording medium) having unfixed toner images is guided by a fixation entrance guide 56 and transported to the nip region N. When the sheet of paper K passes through the nip region N, the toner images on the sheet of paper K are fixed with the pressure and heat applied to the nip region N.

Second Exemplary Embodiment of Fixing Device

Figure 3:
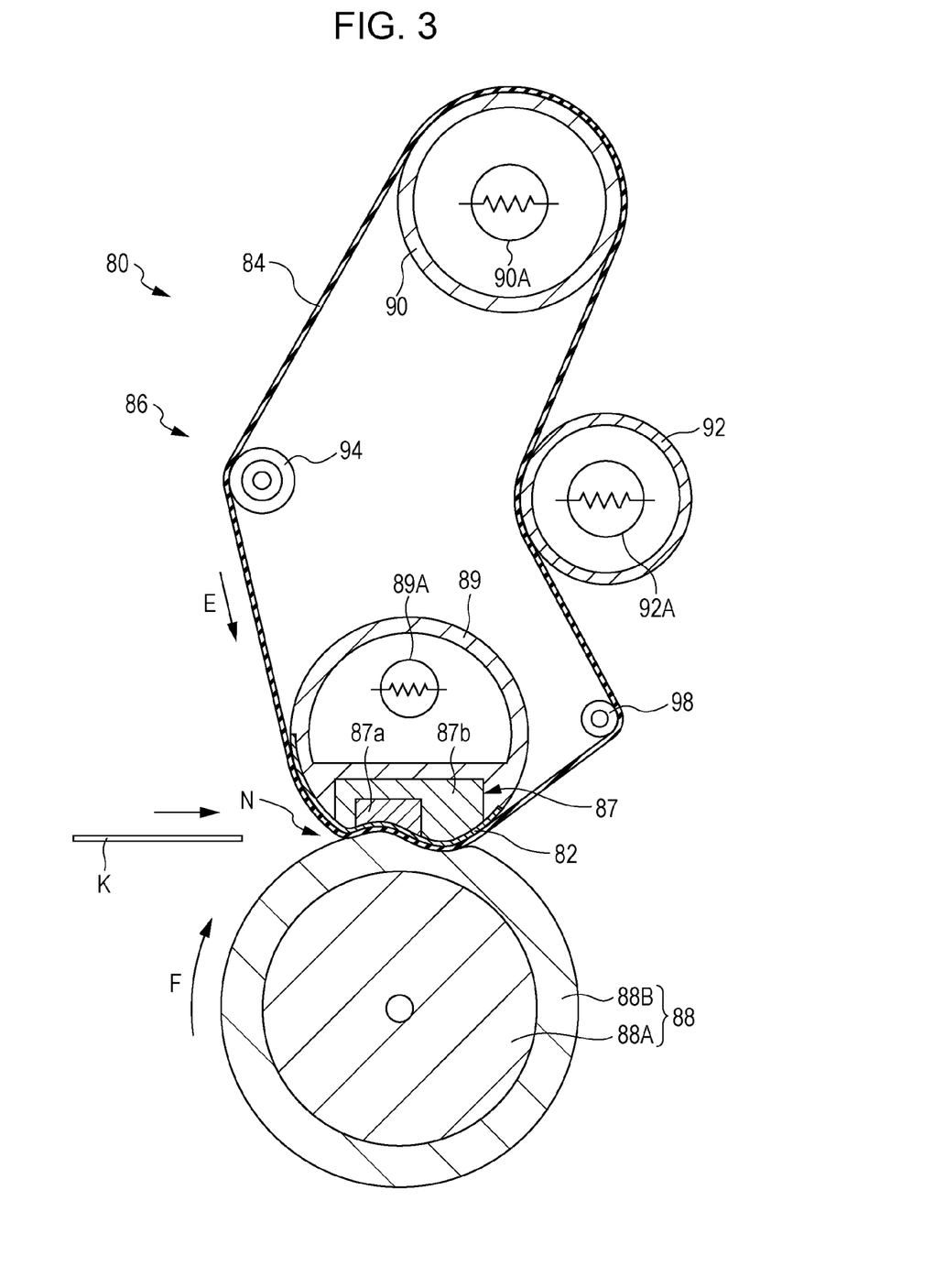
FIG. 3 is a schematic view of another example structure of the fixing device according to the exemplary embodiment.

Referring to FIG. 3, a fixing device 80 according to a second exemplary embodiment will be described.

FIG. 3 is a schematic view of the structure of the fixing device 80 according to the second exemplary embodiment.

The fixing device 80 includes a pressure roller 88 (an example of the first rotary member) and a fixation belt module 86.

The fixation belt module 86 includes a heating belt 84 (an example of the second rotary member), a pressing pad 87 (an example of the pressing member), a sliding member 82 (an example of the sliding member according to the exemplary embodiment), and a halogen heater 89A (an example of the heat source) disposed near the pressing pad 87.

The fixation belt module 86 further includes a supporting roller 90, a supporting roller 92, a posture correction roller 94, and a supporting roller 98.

The pressure roller 88 is pressed by the heating belt 84 (fixation belt module 86) to form a nip region N (nip part) in a region where the pressure roller 88 is in contact with the heating belt 84 (fixation belt module 86).

The heating belt 84 is an endless belt and rotatably supported by the pressing pad 87 and the supporting roller 90, which are disposed inside the heating belt 84.

The heating belt 84 is wound around the pressing pad 87, and the pressing pad 87 presses the heating belt 84 against the pressure roller 88.

The pressing pad 87 includes a front nipping member 87a and a peeling nipping member 87b and is supported by a holding member 89.

The front nipping member 87a has a recess shape in conformance with the outer shape of the pressure roller 88, is disposed on the entrance side of the nip region N, and ensures the length (the distance in the sliding direction) of the nip region N.

The peeling nipping member 87b is shaped so as to protrude toward the outer surface of the pressure roller 88, is disposed on the exit side of the nip region N, and causes local distortion of the pressure roller 88 in an exit region of the nip region N, which makes it easy to peel the recording medium from the pressure roller 88 after fixation.

The halogen heater 89A (an example of the heat source) is provided near the pressing pad 87 (e.g., inside the holding member 89) and heats the heating belt 84 from the inner surface side.

For example, a lubricant supplying device (not shown) may be provided upstream of the front nipping member 87a of the holding member 89. The lubricant supplying device is a device that supplies a lubricant (oil) to the inner surface of the heating belt 84.

The sliding member 82 has a sheet shape and is disposed between the heating belt 84 and the pressing pad 87 in such a manner that the sliding surface (recess-distributed surface) of the sliding member 82 is in contact with the inner surface of the heating belt 84.

The sliding member 82 is involved in the holding and supply of a lubricant (oil) present between the sliding surface of the sliding member 82 and the inner surface of the heating belt 84. The sliding member 82 has high wear resistance and contributes to the life extension of the fixing device 80.

The heating belt 84 is wound around the supporting roller 90 and supports the heating belt 84 in a position different from the position in which the pressing pad 87 supports the heating belt 84.

The supporting roller 90 includes a halogen heater 90A (an example of the heat source) inside and heats the heating belt 84 from the inner surface side.

The supporting roller 90 includes, for example, a 20-μm-thick release layer made of a fluorocarbon resin, for example, on the outer surface of a cylindrical aluminum roller.

The supporting roller 92 is disposed in contact with the outer surface of the heating belt 84 in a position from the pressing pad 87 to the supporting roller 90 and defines the travel path of the heating belt 84.

The supporting roller 92 includes a halogen heater 92A (an example of the heat source) inside and heats the heating belt 84 from the outer surface side.

The supporting roller 92 includes, for example, a 20-μm-thick release layer made of a fluorocarbon resin, for example, on the outer surface of a cylindrical aluminum roller.

The fixing device 80 includes at least one of the halogen heater 89A, the halogen heater 90A, and the halogen heater 92A, which are examples of the heat source.

The posture correction roller 94 is disposed in contact with the inner surface of the heating belt 84 in a position from the supporting roller 90 to the pressing pad 87 and corrects the posture of the heating belt 84 from the supporting roller 90 to the pressing pad 87.

An edge-position measuring mechanism (not shown) that measures the edge position of the heating belt 84 is disposed near the posture correction roller 94. The posture correction roller 94 has an axial displacement mechanism (not shown) that displaces the contact position of the heating belt 84 in the axial direction according to the measurement results from the edge-position measuring mechanism. These mechanisms correct the posture of the heating belt 84.

The posture correction roller 94 is, for example, a cylindrical aluminum roller.

The supporting roller 98 is disposed in contact with the inner surface of the heating belt 84 in a position from the pressing pad 87 to the supporting roller 92. The supporting roller 98 applies tension to the heating belt 84 from the inner surface of the heating belt 84 downstream of the nip region N.

The supporting roller 98 includes, for example, a 20-μm-thick release layer made of a fluorocarbon resin, for example, on the outer surface of a cylindrical aluminum roller.

The pressure roller 88 is disposed on a region of the heating belt 84 wound around the pressing pad 87 in such a manner that the heating belt 84 presses the pressure roller 88.

The pressure roller 88 is rotatably disposed and driven to rotate in the direction of an arrow F by the heating belt 84 as the heating belt 84 rotationally moves in the direction of an arrow E.

The pressure roller 88 includes, for example, an elastic layer 88B made of a silicone rubber and, for example, a 100-μm-thick release layer (not shown) made of a fluorocarbon resin stacked in this order on, for example, the outer surface of a cylindrical aluminum roller 88A.

For example, the supporting roller 90 and the supporting roller 92 are rotated by a drive motor (not shown). The heating belt 84 is driven to rotationally move in the direction of the arrow E by the rotation of the supporting roller 90 and the supporting roller 92. The pressure roller 88 is driven to move in the direction of the arrow F by the rotational movement of the heating belt 84.

A sheet of paper K (recording medium) having unfixed toner images is transported to the nip region N of the fixing device 80. When the sheet of paper K passes through the nip region N, the toner images on the sheet of paper K are fixed with the pressure and heat applied to the nip region N.

Image Forming Apparatus and Process Cartridge

An image forming apparatus according to an exemplary embodiment includes an image carrier; a charging device that charges the surface of the image carrier; a latent-image forming device that forms a latent image on the charged surface of the image carrier; a developing device that develops the latent image by using a toner to form a toner image; a transfer device that transfers the toner image onto a recording medium; and a fixing device that fixes the toner image on the recording medium. The fixing device is the fixing device according to the exemplary embodiment.

A process cartridge according to an exemplary embodiment includes the fixing device according to the exemplary embodiment and is attachable to and detachable from an image forming apparatus.

The image forming apparatus according to the exemplary embodiment will be described below by illustrating an electrophotographic image forming apparatus as an example. The image forming apparatus according to the exemplary embodiment is not limited to an electrophotographic image forming apparatus and may be a known image forming apparatus (e.g., an ink-jet recording apparatus including an endless belt for sheet transport) other than an electrophotographic image forming apparatus. In the image forming apparatus according to the exemplary embodiment, for example, a section including at least the fixing device may have a cartridge structure (process cartridge) detachably attached to the image forming apparatus.

Figure 4:
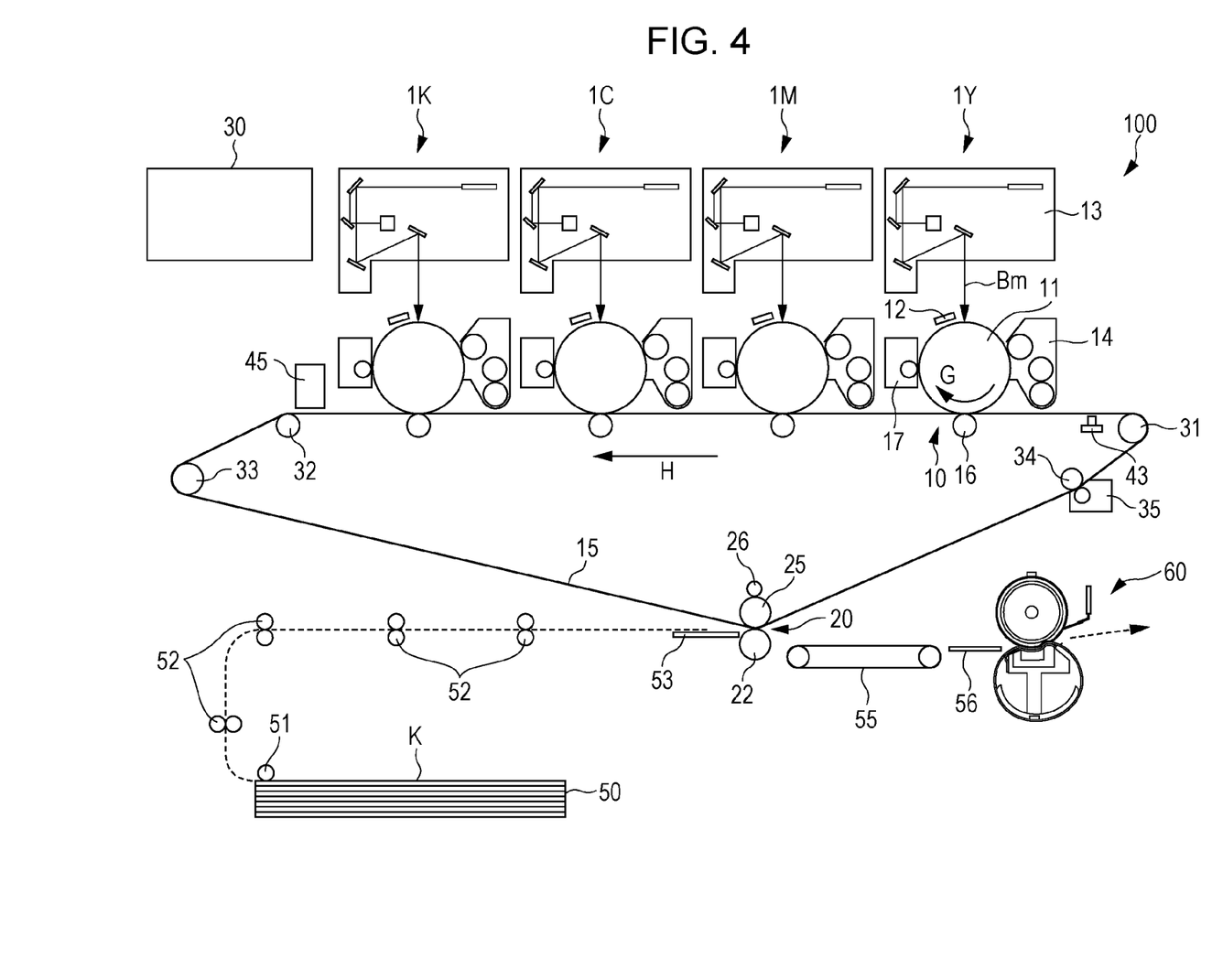
FIG. 4 is a schematic view of an example structure of an image forming apparatus according to an exemplary embodiment.

Referring to FIG. 4, the image forming apparatus according to the exemplary embodiment will be described.

FIG. 4 is a schematic view of the structure of an image forming apparatus 100 according to the exemplary embodiment. The image forming apparatus 100 includes the fixing device 60 according to the first exemplary embodiment. The image forming apparatus 100 may include the fixing device 80 according to the second exemplary embodiment instead of the fixing device 60.

The image forming apparatus 100 is, what is called, a tandem-type intermediate transfer image forming apparatus. The image forming apparatus 100 includes image forming units 1Y, 1M, 1C, and 1K, which form toner images of respective colors by electrophotography; first transfer sections 10, which sequentially transfer (first-transfer) the toner images of respective colors onto an intermediate transfer belt 15; a second transfer section 20, which collectively transfers (second-transfers), onto a sheet of paper K being a recording medium, the superimposed toner images that have been transferred on the intermediate transfer belt 15; the fixing device 60, which fixes the second-transferred images on the sheet of paper K; and a controller 30, which controls the operation of each device (each section).

The image forming units 1Y, 1M, 1C, and 1K are substantially linearly arranged in the order of 1Y (yellow unit), 1M (magenta unit), 1C (cyan unit), and 1K (black unit) from the upstream side of the intermediate transfer belt 15.

The image forming units 1Y, 1M, 1C, and 1K each include a photoreceptor 11 (an example of the image carrier). The photoreceptor 11 rotates in the direction of an arrow G.

Each photoreceptor 11 is surrounded by a charger 12 (an example of the charging device), a laser exposure unit 13 (an example of the latent-image forming device), a developing unit 14 (an example of the developing device), a first transfer roller 16, and a photoreceptor cleaner 17 in this order in the rotation direction of the photoreceptor 11.

Each charger 12 charges the surface of the corresponding photoreceptor 11.

Each laser exposure unit 13 emits an exposure beam Bm to form an electrostatic latent image on the corresponding photoreceptor 11.

Each developing unit 14 contains a corresponding color toner and visualizes the electrostatic latent image on the corresponding photoreceptor 11 by using the toner.

Each first transfer roller 16 transfers the toner image on the corresponding photoreceptor 11 onto the intermediate transfer belt 15 in a first transfer section 10.

Each photoreceptor cleaner 17 removes residual toner from the corresponding photoreceptor 11.

The intermediate transfer belt 15 is made of a material obtained by adding an antistatic agent, such as carbon black, to a resin, such as polyimide or polyamide. The intermediate transfer belt 15 has a volume resistivity of, for example, $10^6$ Ωcm or more and $10^{14}$ Ωcm or less and has a thickness of, for example, 0.1 mm.

The intermediate transfer belt 15 is supported by a driving roller 31, a supporting roller 32, a tension applying roller 33, a back-surface roller 25, and a cleaning back-surface roller 34. The intermediate transfer belt 15 is driven to circulate (rotate) in the direction of an arrow H as the driving roller 31 rotates.

The driving roller 31 is driven by a motor (not shown) with constant speed so as to rotate the intermediate transfer belt 15.

The supporting roller 32, together with the driving roller 31, supports the intermediate transfer belt 15, which extends substantially linearly in the arrangement direction of the four photoreceptors 11.

The tension applying roller 33 applies constant tension to the intermediate transfer belt 15 and also functions as a correction roller that prevents or reduces meandering of the intermediate transfer belt 15.

The back-surface roller 25 is disposed in the second transfer section 20. The cleaning back-surface roller 34 is disposed in a cleaning section where residual toner is scraped off from the intermediate transfer belt 15.

The first transfer rollers 16 are arranged in pressure contact with the respective photoreceptors 11 with the intermediate transfer belt 15 interposed therebetween, forming the first transfer sections 10.

The first transfer rollers 16 receive a voltage (first transfer bias) with a polarity opposite to the charging polarity (negative polarity; the same applies hereinafter) of the toners. Thus, the toner images on the photoreceptors 11 are sequentially electrostatically attracted to the intermediate transfer belt 15, whereby the superimposed toner images are formed on the intermediate transfer belt 15.

Each first transfer roller 16 is a cylindrical roller including a shaft (e.g., a columnar rod made of a metal, such as iron or SUS) and an elastic layer (e.g., a sponge layer made of a blended rubber containing an electrically conductive agent, such as carbon black) attached to the surface of the shaft. Each first transfer roller 16 has a volume resistivity of, for example, $10^{7.5}$ Ωcm or more and $10^{8.5}$ Ωcm or less.

A second transfer roller 22 is disposed in pressure contact with the back-surface roller 25 with the intermediate transfer belt 15 interposed therebetween, forming the second transfer section 20.

The second transfer roller 22 generates a second transfer bias between the second transfer roller 22 and the back-surface roller 25 and second-transfers the toner images onto the sheet of paper K (recording medium) transported to the second transfer section 20.

The second transfer roller 22 is a cylindrical roller including a shaft (e.g., a columnar rod made of a metal, such as iron or SUS) and an elastic layer (e.g., a sponge layer made of a blended rubber containing an electrically conductive agent, such as carbon black) attached to the surface of the shaft. The second transfer roller 22 has a volume resistivity of, for example, $10^{7.5}$ Ωcm or more and $10^{8.5}$ Ωcm or less.

The back-surface roller 25 is disposed on the back surface side of the intermediate transfer belt 15. The back-surface roller 25 serves as a counter electrode for the second transfer roller 22 and forms a transfer electric field between the back-surface roller 25 and the second transfer roller 22.

The back-surface roller 25 is formed by, for example, covering a rubber base material with a tube made of a blended rubber containing carbon dispersed therein. The back-surface roller 25 has a surface resistivity of, for example, $10^7$ Ω/□ or more and $10^{10}$ Ω/□ or less and a hardness of, for example, 70° (ASKER C available from Kobunshi Keiki Co., Ltd.; the same applies hereinafter).

The back-surface roller 25 is disposed in contact with a power supply roller 26 made of metal. The power supply roller 26 applies a voltage (second transfer bias) with the same polarity as the charging polarity (negative polarity) of the toners so as to form a transfer electric field between the second transfer roller 22 and the back-surface roller 25.

An intermediate-transfer-belt cleaner 35 is disposed at the intermediate transfer belt 15 downstream of the second transfer section 20 so as to move toward and away from the intermediate transfer belt 15. The intermediate-transfer-belt cleaner 35 removes residual toner and sheet powder from the intermediate transfer belt 15 after second transfer.

A reference sensor (home-position sensor) 43 is disposed upstream of the image forming unit 1Y. The reference sensor 43 generates a reference signal to be used as a reference for controlling the image forming timing in each image forming unit. The reference sensor 43 generates the reference signal in response to sensing a mark on the back side of the intermediate transfer belt 15. The image forming units 1Y, 1M, 1C, and 1K start image formation according to the instruction from the controller 30 that has sensed the reference signal.

An image density sensor 45 for performing image quality adjustment is disposed downstream of the image forming unit 1K.

The image forming apparatus 100 includes a paper storage part 50, a paper feed roller 51, a transport roller 52, a transport guide 53, a transport belt 55, and a fixation entrance guide 56 as a transport unit that transports sheets of paper K.

The paper storage part 50 stores sheets of paper K before image formation.

The paper feed roller 51 feeds each sheet of paper K stored in the paper storage part 50.

The transport roller 52 transports the sheet of paper K fed by the paper feed roller 51.

The transport guide 53 delivers, to the second transfer section 20, the sheet of paper K transported by the transport roller 52.

The transport belt 55 transports, to the fixing device 60, the sheet of paper K to which an image has been transferred in the second transfer section 20.

The fixation entrance guide 56 guides the sheet of paper K to the fixing device 60.

Next, an image forming method by the image forming apparatus 100 will be described.

In the image forming apparatus 100, an image processor (not shown) performs image processing on image data outputted from an image reader (not shown), a computer (not shown), or the like, and the image forming units 1Y, 1M, 1C, and 1K execute image formation.

The image processor performs image processing, such as shading correction, misregistration correction, lightness/color-space conversion, gamma correction, margin deletion, color editing, or moving editing, on inputted reflectance data. The image-processed image data is converted to color material gradation data for four colors, that is, Y, M, C, and K colors, and is outputted to the laser exposure units 13.

The laser exposure units 13 radiate exposure beams Bm onto the respective photoreceptors 11 in the image forming units 1Y, 1M, 1C, and 1K according to the inputted color material gradation data.

The surfaces of the photoreceptors 11 in the image forming units 1Y, 1M, 1C, and 1K are charged by the chargers 12 and subjected to scanning exposure by the laser exposure units 13, whereby electrostatic latent images are formed on the respective photoreceptors 11. The electrostatic latent images formed on the respective photoreceptors 11 are developed into toner images of the respective colors by the image forming units.

The toner images formed on the respective photoreceptors 11 in the image forming units 1Y, 1M, 1C, and 1K are transferred onto the intermediate transfer belt 15 in the first transfer sections 10 where the photoreceptors 11 are in contact with the intermediate transfer belt 15. In the first transfer sections 10, the first transfer rollers 16 apply a voltage (first transfer bias) with a polarity opposite to the charging polarity (negative polarity) of the toners to the intermediate transfer belt 15, and the toner images are sequentially superimposed on top of one another and transferred onto the intermediate transfer belt 15.

The toner images that have been first-transferred on the intermediate transfer belt 15 are transported to the second transfer section 20 as the intermediate transfer belt 15 moves.

At the same time as the toner images reach the second transfer section 20, a sheet of paper K stored in the paper storage part 50 is fed to the second transfer section 20 by being transported by the paper feed roller 51, the transport roller 52, and the transport guide 53 and nipped between the intermediate transfer belt 15 and the second transfer roller 22.

The toner images on the intermediate transfer belt 15 are then electrostatically transferred (second-transferred) onto the sheet of paper K in the second transfer section 20 where a transfer electric field is formed.

The sheet of paper K having the toner images electrostatically transferred thereon is peeled off from the intermediate transfer belt 15 by the second transfer roller 22 and is transported to the fixing device 60 by the transport belt 55.

The sheet of paper K that has been transported to the fixing device 60 is heated and pressed by the fixing device 60 to fix the unfixed toner images on the sheet of paper K.

The image forming apparatus 100 forms an image on the recording medium through the foregoing process.

EXAMPLES

Examples of the present disclosure will be described below, but the present disclosure is not limited to the following Examples. In the following description, the units "part" and "%" are all on a mass basis, unless otherwise specified.

The surface resistivity of the surface layer and the volume resistivity of the transfer belt are determined by the foregoing methods.

Example 1

Production of Surface Layer

A tetrafluoroethylene-perfluoroalkyl vinyl ether copolymer (PFA resin) pellet (350-J available from Chemours-Mitsui Fluoroproducts Co., Ltd.) and 15 vol % of carbon nanotube (CNT) (VGCF-H available from Showa Denko K.K., fiber diameter 150 nm, fiber length 6 μm, aspect ratio 40) were melt-kneaded. The melt-kneaded product was formed into an extruded sheet (surface layer sheet) with a thickness of 50 μm in a sheet extruder.

The filler in the thin sheet was observed under an optical microscope. As a result of observation of 50 filler molecules to determine the orientation ratio A, A=80%, and the carbon nanotube highly oriented in the extrusion direction was observed.

Production of Sliding Sheet

A glass cloth substrate (trade name P0.05×1260 available from Arisawa Mfg. Co., Ltd., thickness 60 μm) was provided and sandwiched between the surface layer sheets by fusion bonding to form a sliding sheet.

Example 2

A polytetrafluoroethylene (PTFE) dispersion (aqueous dispersion) (31-JR available from Chemours-Mitsui Fluoroproducts Co., Ltd.) was mixed with 15 vol % (relative to PTFE solid content) of a carbon nanotube (VGCF-H available from Showa Denko K.K.). The mixture was then applied to a smooth aluminum substrate at a blade gap of 100 μm, dried at 60° C. for 30 minutes, and fired at 380° C. for 1 hour. The resulting sheet was peeled off from the aluminum substrate to provide a PTFE sheet (surface layer sheet) with a thickness of 50 μm. A sliding sheet was obtained in the same manner as in Example 1 except the above process.

The orientation ratio A of the obtained sliding sheet was 75%.

Example 3

The carbon nanotube in the production of the surface layer of Example 1 was replaced by NC7000 available from Nanocyl SA (fiber diameter 9.5 nm, fiber length 1.5 μm, aspect ratio 158) to provide a PFA sheet (surface layer sheet) with a thickness of 50 μm. As a result of optical microscopic observation, the carbon nanotube was randomly oriented, and the orientation ratio A was 84%. A sliding sheet was obtained in the same manner as in Example 1 except the above process and features.

Example 4

The amount of carbon nanotube in the production of the surface layer of Example 1 was changed to 25 vol % to provide a PFA sheet (surface layer sheet) with a thickness of 50 μm. As a result of optical microscopic observation, the carbon nanotube was randomly oriented, and the orientation ratio A was 84%. A sliding sheet was obtained in the same manner as in Example 1 except the above process and features.

Example 5

The fluorocarbon resin pellet in the production of the surface layer of Example 1 was replaced by a tetrafluoroethylene-hexafluoropropylene copolymer (FEP) (100-J available from Chemours-Mitsui Fluoroproducts Co., Ltd.) to provide a PFA sheet (surface layer sheet) with a thickness of 50 μm. As a result of optical microscopic observation, the carbon nanotube was randomly oriented, and the orientation ratio A was 82%. A sliding sheet was obtained in the same manner as in Example 1 except the above process and features.

Example 6

The slit width of the sheet extruder in the production of the surface layer of Example 1 was enlarged to provide a PFA sheet (surface layer sheet) with a thickness of 80 μm. As a result of optical microscopic observation, the carbon nanotube was randomly oriented, and the orientation ratio A was 64%. A sliding sheet was obtained in the same manner as in Example 1 except the above process and features.

The reason why the orientation ratio A was low may be because the shear stress on the material was reduced by enlarging the slit width in this Example.

Comparative Example 1

The melt-kneaded product of the PFA resin containing the carbon nanotube in the production of the surface layer of Example 1 was compressed into a cylindrical body. The cylindrical body was subjected to skive cutting from the surface to provide a PFA sheet (surface layer sheet) with a thickness of 50 μm. As a result of optical microscopic observation, the carbon nanotube was randomly oriented, and the orientation ratio A was 40%. A sliding sheet was obtained in the same manner as in Example 1 except the above process and features.

Comparative Example 2

The mixture containing the carbon nanotube and the PTFE resin in the production of the surface layer of Example 2 was compressed into a cylindrical body. The cylindrical body was subjected to skive cutting from the surface to provide a PTFE sheet (surface layer sheet) with a thickness of 50 μm. As a result of optical microscopic observation, the carbon nanotube was randomly oriented, and the orientation ratio A was 45%. A sliding sheet was obtained in the same manner as in Example 1 except the above process and features.

Comparative Example 3

A sliding sheet was obtained in the same manner as in Example 2 except that no carbon nanotube was mixed in the production of the surface layer of Example 2.

Evaluation Method

Evaluation of Dynamic Friction Coefficient

A polyimide sheet was placed on a stage heated to 170° C. in a friction and wear tester (FPR-2100 available from RHESCA Co., Ltd.), and a sliding sheet was placed in contact with a pin. The dynamic friction coefficient in rotation sliding at 100 mm/s and a radius of 40 mm was measured.

Evaluation of Wear Resistance

The rotation sliding test was carried out for 6 hours by using a friction and wear tester (FPR-2100 available from RHESCA Co., Ltd.) under the same conditions as that in the evaluation of dynamic friction coefficient. The thickness of the sliding sheet at the beginning and after the test was measured, and the wear resistance was evaluated on the basis of the amount of reduction in thickness. The smaller the amount of reduction, the higher the wear resistance. The values described in the section of wear resistance evaluation in Table 1 indicate the amount (μm) of reduction in thickness.

disclosed. Obviously, many modifications and variations will be apparent to practitioners skilled in the art. The embodiments was/were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sliding member comprising:
   a resin; and
   a fibrous filler,
   wherein a dynamic friction coefficient $\mu A$ of a surface of the sliding member in an in-plane direction A of the surface is 0.08 or more lower than a dynamic friction coefficient $\mu B$ of the surface in an in-plane direction B angled at 90 degrees with respect to the in-plane direction A.

2. The sliding member according to claim 1, wherein the resin contains a fluorocarbon resin or a polyimide resin.

3. The sliding member according to claim 1, wherein the resin contains a fluorocarbon resin.

4. The sliding member according to claim 3, wherein the fluorocarbon resin is at least one resin selected from the group consisting of polytetrafluoroethylene, a tetrafluoroethylene-perfluoroalkyl vinyl ether copolymer, and a tetrafluoroethylene-hexafluoropropylene copolymer.

5. The sliding member according to claim 1, wherein the dynamic friction coefficient $\mu A$ in the in-plane direction A is 0.1 or more and 0.3 or less.

6. The sliding member according to claim 1, wherein the dynamic friction coefficient $\mu B$ in the in-plane direction B angled at 90 degrees with respect to the in-plane direction A is 0.3 or more and 0.5 or less.

7. The sliding member according to claim 1, wherein a ratio ($\mu A/\mu B$) of the dynamic friction coefficient $\mu A$ in the

TABLE 1

| | | Fibrous Filler | | | | Dynamic Friction Coefficient $\mu A$ in In-plane Direction A | Dynamic Friction Coefficient $\mu B$ in In-plane Direction B | Wear Resistance Evaluation (μm) |
|---|---|---|---|---|---|---|---|---|
| | Resin | Type | Aspect Ratio | Fiber Diameter (μm) | Fiber Length (μm) | Orientation Ratio A (%) | | | |
| Example 1 | PFA | CNT | 40 | 0.150 | 6 | 80 | 0.25 | 0.40 | 3 |
| Example 2 | PTFE | CNT | 40 | 0.150 | 6 | 75 | 0.19 | 0.33 | 2 |
| Example 3 | PFA | CNT | 158 | 0.010 | 1.5 | 84 | 0.24 | 0.38 | 3 |
| Example 4 | PFA | CNT | 40 | 0.150 | 6 | 75 | 0.26 | 0.48 | 1 |
| Example 5 | FEP | CNT | 40 | 0.150 | 6 | 82 | 0.28 | 0.50 | 3 |
| Example 6 | PFA | CNT | 40 | 0.150 | 6 | 64 | 0.30 | 0.42 | 4 |
| Comparative Example 1 | PFA | CNT | 40 | 0.150 | 6 | 40 | 0.45 | 0.47 | 40 |
| Comparative Example 2 | PTFE | CNT | 40 | 0.150 | 6 | 45 | 0.42 | 0.41 | 42 |
| Comparative Example 3 | PTFE | — | — | — | — | — | 0.25 | 0.25 | 45 |

The results shown in Table 1 indicate that the sliding members of Examples have lower dynamic friction coefficient and higher wear resistance than the sliding members of Comparative Examples.

The foregoing description of the exemplary embodiments of the present disclosure has been provided for the purposes of illustration and description. It is not intended to be exhaustive or to limit the disclosure to the precise forms in-plane direction A to the dynamic friction coefficient $\mu B$ in the in-plane direction B angled at 90 degrees with respect to the in-plane direction A is 0.2 or more and 0.9 or less.

8. The sliding member according to claim 7, wherein the ratio ($\mu A/\mu B$) of the dynamic friction coefficient $\mu A$ in the in-plane direction A to the dynamic friction coefficient $\mu B$ in the in-plane direction B angled at 90 degrees with respect to the in-plane direction A is 0.4 or more and 0.75 or less.

9. The sliding member according to claim 1, wherein the fibrous filler has an aspect ratio of 5 or more.

10. The sliding member according to claim 1, wherein the fibrous filler is a carbon nanotube.

11. The sliding member according to claim 1, wherein the fibrous filler has a fiber diameter of 0.01 µm or more and 1.5 µm or less.

12. The sliding member according to claim 11, wherein the fibrous filler has a fiber diameter of 0.05 µm or more and 0.5 µm or less.

13. The sliding member according to claim 1, wherein the fibrous filler has a fiber length of 1 µm or more and 60 µm or less.

14. The sliding member according to claim 13, wherein the fibrous filler has a fiber length of 2 µm or more and 20 µm or less.

15. A fixing device comprising:
a first rotary member;
a second rotary member disposed in contact with an outer surface of the first rotary member;
a pressing member that is disposed inside the second rotary member and presses the second rotary member from an inner surface of the second rotary member against the first rotary member; and
a sliding member interposed between the inner surface of the second rotary member and the pressing member,
wherein the sliding member is the sliding member according to claim 1.

16. A process cartridge comprising the fixing device according to claim 15, wherein the process cartridge is attachable to and detachable form an image forming apparatus.

17. A image forming apparatus comprising:
an image carrier;
a charging unit that charges a surface of the image carrier;
a latent image forming unit that forms a latent image on the charged surface of the image carrier;
a developing unit that develops the latent image by using a toner to form a toner image;
a transfer unit that transfers the toner image onto a recording medium; and
a fixing unit that fixes the toner image on the recording medium,
wherein the fixing unit is the fixing device according to claim 15.

* * * * *